(12) United States Patent
Jia et al.

(10) Patent No.: US 8,050,697 B2
(45) Date of Patent: Nov. 1, 2011

(54) MULTI-ANTENNA SCHEDULING SYSTEM AND METHOD

(75) Inventors: Ming Jia, Ottawa (CA); Jianglei Ma, Kanata (CA); Jianming Wu, Kanata (CA); Peiying Zhu, Kanata (CA); Wen Tong, Ottawa (CA)

(73) Assignee: Nortel Networks Limited, Mississauga, Ontario (CA)

( * ) Notice: Subject to any disclaimer, the term of this patent is extended or adjusted under 35 U.S.C. 154(b) by 1088 days.

(21) Appl. No.: 11/843,098

(22) Filed: Aug. 22, 2007

(65) Prior Publication Data

US 2008/0049820 A1    Feb. 28, 2008

Related U.S. Application Data

(60) Provisional application No. 60/823,196, filed on Aug. 22, 2006.

(51) Int. Cl.
*H04B 7/00* (2006.01)
(52) U.S. Cl. .......................... 455/513; 455/507; 375/299
(58) Field of Classification Search .................. 455/39, 455/403, 422.1, 450, 451, 452.1, 452.2, 453, 455/454, 500, 507, 509–513; 375/259–260, 375/296, 340, 346, 347
See application file for complete search history.

(56) References Cited

U.S. PATENT DOCUMENTS

| | | | |
|---|---|---|---|
| 2003/0125040 A1* | 7/2003 | Walton et al. ................. | 455/454 |
| 2004/0114618 A1* | 6/2004 | Tong et al. .................... | 370/431 |
| 2005/0195889 A1 | 9/2005 | Grant et al. | |
| 2006/0039312 A1 | 2/2006 | Walton et al. | |
| 2006/0079221 A1 | 4/2006 | Grant et al. | |
| 2006/0121946 A1 | 6/2006 | Walton et al. | |

OTHER PUBLICATIONS

A.F. Naguib, N. Seshadri, and A.R. Calderbank, "Applications of space-time block codes and interference suppression for high capacity and high data rate wireless systems," Thirty-Second Asilomar Conference on Signals, Systems & Computers, vol. 2, pp. 1803-1810, 1998 IEEE.

* cited by examiner

*Primary Examiner* — Dac Ha
*Assistant Examiner* — James M Perez
(74) *Attorney, Agent, or Firm* — Christopher & Weisberg, P.A.

(57) ABSTRACT

A wireless communication method and system using virtual MIMO ("V-MIMO") are provided. Post processing signal to interference and noise ratios ("SINR") for a plurality of signals corresponding to a plurality of mobile terminals arranged as a V-MIMO group are estimated. The one of the plurality of mobile terminals having the highest post processing SINR is selected. Wireless communication for the selected mobile terminal is scheduled. The signal corresponding to the selected mobile terminal is cancelled. Post processing signal to interference and noise ratios ("SINR") for the signals corresponding to the remaining mobile terminals is re-estimated. The one of the remaining mobile terminals having the highest post processing SINR is selected. Wireless communication for the selected remaining mobile terminal is scheduled.

20 Claims, 6 Drawing Sheets

MULTI-ANTENNA SCHEDULING SYSTEM AND METHOD

CROSS-REFERENCE TO RELATED APPLICATION

This application is related to and claims priority to U.S. Provisional Application Ser. No. 60/823,196, filed Aug. 22, 2006, entitled Multi-Antenna Scheduling Systems and Methods, the entirety of which is incorporated herein by reference.

STATEMENT REGARDING FEDERALLY SPONSORED RESEARCH OR DEVELOPMENT n/a

FIELD OF THE INVENTION

The present invention relates to wireless network communications and particular to a method and system for increasing wireless communication network spectral efficiency in multiple input multiple output ("MIMO") antenna systems through the use of resource scheduling.

BACKGROUND OF THE INVENTION

Wireless communication networks, such as cellular networks, operate by sharing resources among the mobile terminals operating in the communication network. As part of the sharing process, resources relating to assigned channels, codes, etc. are allocated by one or more controlling devices within the system. Certain types of wireless communication networks, e.g., orthogonal frequency division multiplexed ("OFDM") networks, are used to support cell-based high speed services such as those under certain standards such as the 3rd Generation Partnership Project ("3GPP") and 3GPP2 evolutions, e.g., Long Term Evolution ("LTE"), the Ultra-Mobile Broadband ("UMB") broadband wireless standard and the IEEE 802.16 standards. The IEEE 802.16 standards are often referred to as WiMAX or less commonly as WirelessMAN or the Air Interface Standard.

OFDM technology uses a channelized approach and divides a wireless communication channel into many sub-channels which can be used by multiple mobile terminals at the same time. These sub-channels and hence the mobile terminals can be subject to interference from adjacent cells and other mobile terminals because neighboring base stations and mobile terminals can use the same frequency blocks. The result is that spectral efficiency is reduced, thereby reducing both communication throughput as well as the quantity of mobile terminals that can be supported in the network.

This problem is further exacerbated in multiple input, multiple output ("MIMO") environments. Multiple Input, Multiple Output Orthogonal Frequency Division Multiplexing ("MIMO-OFDM") is an OFDM technology that uses multiple antennas to transmit and receive radio signals. MIMO-OFDM allows service providers to deploy wireless broadband systems that take advantage of the multi-path properties of environments using base station antennas that do not necessarily have line of sight communications with the mobile terminal.

MIMO systems use multiple antennas to simultaneously transmit data, in small pieces to the receiver, which processes the separate data transmissions and puts them back together. This process, called spatial multiplexing, can be used to proportionally boost the data-transmission speed by a factor equal to the number of transmitting antennas. In addition, since all data is transmitted both in the same frequency band and with separate spatial signatures, this technique utilizes spectrum very efficiently.

MIMO operation implements a channel matrix (N×M) where N is the number of transmit antennas and M is the number of receive antennas to define the coding and modulation matrix for the wireless communication channel as a whole. The less correlated each column in the matrix is, the less interference experienced in each channel (as a result of the multiple antennas). In the case where there is a totally uncorrelated arrangement, i.e., the dot product between columns is zero, the channels are considered orthogonal to one another. Orthogonality provides the least antenna-to-antenna interference, thereby maximizing channel capacity, and data rate due to the higher post-processing signal to interference and noise ratio ("PP-SINR"). PP-SINR is the SINR after the MIMO decoding stage.

Virtual MIMO ("V-MIMO") implements the MIMO technique described above by using multiple simultaneously transmitting mobile terminals each having one or more antennas. The serving base station includes multiple antennas. Although the base station can treat virtual MIMO operation as traditional MIMO in which a single mobile terminal has multiple antennas and can separate and decode the transmissions from the multiple simultaneously transmitting mobile terminals, channel correlation among mobile terminals as discussed above results in channel capacity loss due to inter-mobile terminal interference. Scheduling the transmissions from the multiple mobile terminals to share channel resources can provide system capacity gain (also referred to as "scheduling gain"). It is therefore desirable to have a virtual MIMO arrangement that maximizes system capacity through the use of scheduling gain.

It is known that orthogonality-based scheduling can reduce inter-mobile terminal interference. However, this arrangement only works well in narrow-band implementations because the channel characteristics, e.g., attenuation, phase, etc., do not significantly change because the channel is almost constant in the frequency band. In other words, the channel matrix that defines the channel also does not significantly change. In contrast, wideband diversity channel implementations, such as OFDM, can result in different channel characteristics across the frequency band. The result is that a wideband diversity channel that is orthogonal at one point does not mean that the channel is orthogonal at a different spot within the channel. Hence, orthogonality based scheduling is likely ineffective in wideband implementations.

Arrangements for MIMO wideband transmission scheduling are known. For example, it is known to schedule MIMO transmission by matching the modulation coding set ("MCS") of each layer, where a layer is an independent parallel transmitted data stream, i.e., data streams from multiple mobile terminals in a virtual MIMO environment, to the channel quality indicator ("CQI") of that layer. However, using these known techniques, the CQI of each layer is computed according to the post-processing effective SINR, i.e., after spacial processing by the base station. The undesirable result is that this arrangement is processing intensive and does not adequately exploit the channel capacity. It is therefore further desirable to have a scheduling arrangement that can be implemented in OFDM virtual MIMO environments to support, for example, WiMAX communications such that channel capacity is used in as efficient a manner as possible.

SUMMARY OF THE INVENTION

The present invention advantageously provides a method and system for wireless uplink communication in a virtual MIMO environment by using decision-based feedback interference cancellation. The use of decision-based feedback interference cancellation advantageously exploits multi-user gain thereby providing greater wireless channel data throughput capacity than is possible using currently known techniques. It is noted that the present invention can be implemented in conventional MIMO environments as well.

In accordance with one aspect, the present invention provides a method for wireless communication in which post processing signal to interference and noise ratios ("SINR") for a plurality of signals corresponding to a plurality of mobile terminals arranged as a V-MIMO group are estimated. The one of the plurality of mobile terminals having the highest post processing SINR is selected. Wireless communication for the selected mobile terminal is scheduled. The signal corresponding to the selected mobile terminal is cancelled. Post processing signal to interference and noise ratios ("SINR") for the signals corresponding to the remaining mobile terminals is re-estimated. The one of the remaining mobile terminals having the highest post processing SINR is selected. Wireless communication for the selected remaining mobile terminal scheduled.

In accordance with another aspect, the present invention provides a wireless communication method in which post processing signal to interference and noise ratios ("SINR") for a first signal corresponding to a first mobile terminal and second signal corresponding to a second mobile terminal arranged as a V-MIMO group are estimated. Wireless communication for the one of the first and second mobile terminals having the highest post processing SINR is scheduled. The signal corresponding to the one of the first and second mobile terminals having the highest post processing SINR is cancelled. A post processing signal to interference and noise ratio ("SINR") for the signal corresponding to the remaining one of the first mobile terminal and the second mobile terminal is re-estimated. Wireless communication for the remaining one of the first and second mobile terminals is scheduled.

In accordance with still another aspect, the present invention provides a wireless communication system in which the system has a scheduling device. The device includes a central processing unit operating to:
  estimate post processing signal to interference and noise ratios ("SINR") for the plurality of signals corresponding to a plurality of mobile terminals arranged as a virtual MIMO (V-MIMO) group;
  select the one of the plurality of mobile terminals having the highest post processing SINR;
  schedule wireless communication for the selected mobile terminal;
  cancel the signal corresponding to the selected mobile terminal;
  re-estimate post processing signal to interference and noise ratios ("SINR") for the signals corresponding to the remaining mobile terminals;
  select the one of the remaining mobile terminals having the highest post processing SINR; and
  schedule wireless communication for the selected remaining mobile terminal.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

As an initial matter, while certain embodiments may discussed in the context of wireless networks operating in accordance with a particular wireless standard, the invention is not limited in this regard and may be applicable to other broadband networks including those operating in accordance with wireless standards such as those using OFDM orthogonal frequency division ("OFDM")-based systems including WiMAX (IEEE 802.16) and 3rd Generation Partnership Project ("3GPP") evolution, e.g., Long Term Evolution ("LTE"), Ultra-Mobile Broadband ("UMB"), etc. Similarly, the present invention is not limited solely to OFDM-based systems and can be implemented in accordance with other system technologies, e.g., CDMA.

Figure 1:
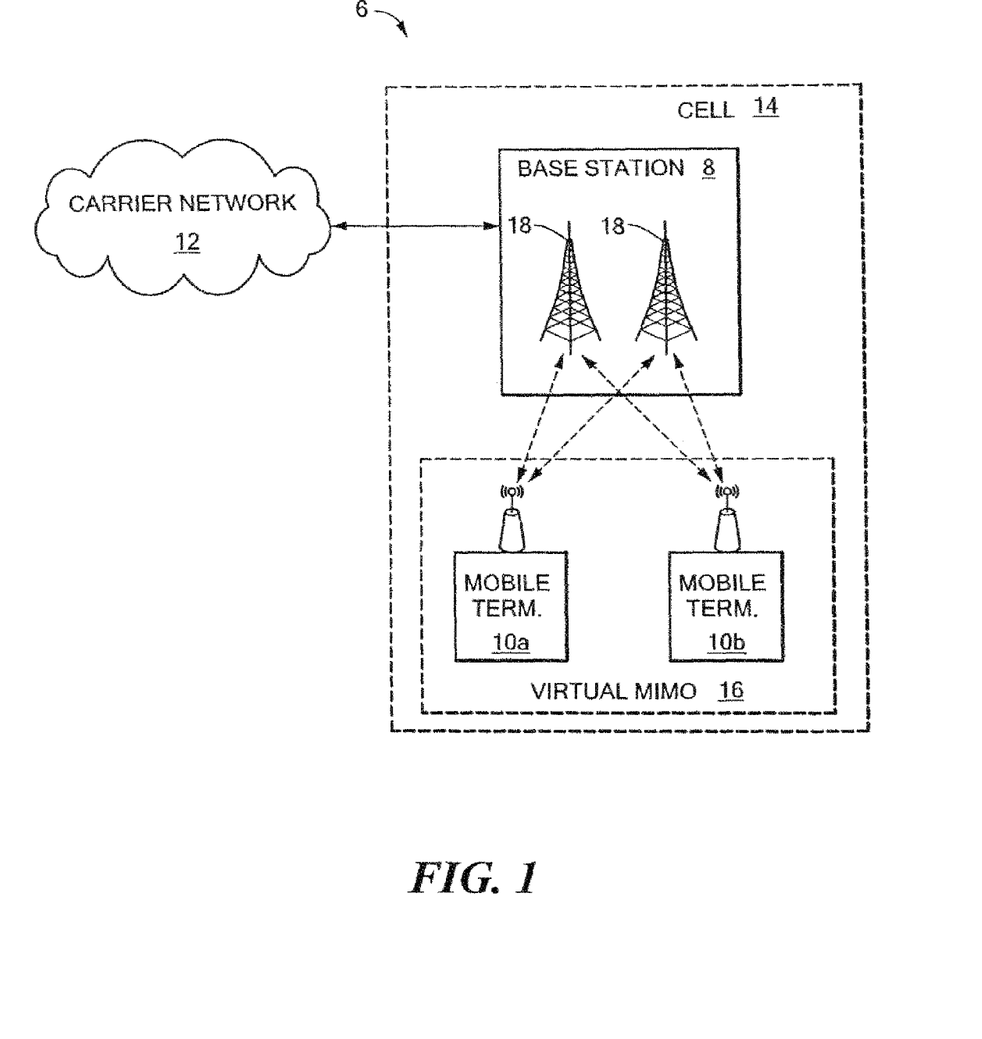
FIG. 1 is a diagram of an embodiment of a system constructed in accordance with the principles of the present invention.

Referring now to the drawing figures in which like reference designators refer to like elements, there is shown in FIG. 1, a system constructed in accordance with the principles of the present invention and designated generally as "6." System 6 includes one or more base stations 8 and one or more mobile terminals 10 (shown as mobile terminals 10a and 10b in FIG. 1). Although not shown, mobile terminals 10 can communicate with base stations 8 via one or more relay nodes. Base stations 8 communicate with one another and with external networks, such as the Internet (not shown), via carrier network 12. Base stations 8 engage in wireless communication with mobile terminals 10 directly or via one or more relay nodes. Similarly, mobile terminals 10 engage in wireless communication with base stations 8 directly or via one or more relay nodes.

Base station 8 can be any base station arranged to wirelessly communicate with mobile terminals 10. Base stations 8 include the hardware and software used to implement the functions described herein to support the V-MIMO transmission scheduling functions. Base stations 8 include a central processing unit, transmitter, receiver, I/O devices and storage such as volatile and nonvolatile memory as may be needed to implement the functions described herein. Base stations 8 are described in additional detail below.

Mobile terminals 10, also described in detail below, can be any of a wide variety of mobile terminals including, but not limited to, a computing device equipped for wireless communication, cell phone, wireless data terminal, wireless personal digital assistant ("PDA") and the like. Mobile terminals 10 also include the hardware and software suitable to support the functions needed to engage in wireless V-MIMO communication with base station 8. Such hardware can include a receiver, transmitter, central processing unit, storage in the form of volatile and nonvolatile memory, input/output devices, etc.

Relay nodes (not shown) are optionally used to facilitate wireless communication between mobile terminal 10 and base station 8 in the uplink (mobile terminal 10 to base station 8) and/or the downlink (base station 8 to mobile terminal 10). A relay node configured in accordance with the principles of the present invention includes a central processing unit, storage in the form of volatile and/or nonvolatile memory, transmitter, receiver, input/output devices and the like. Relay nodes also include software to implement the MAC control functions described herein. Of note, the arrangement shown in FIG. 1 is general in nature and other specific communication embodiments constructed in accordance with the principles of the present invention are contemplated.

Although not shown, system 6 can include a base station controller ("BSC") that controls wireless communications within multiple cells, which are served by corresponding base stations ("BS") 8. It is understood that some implementations, such as LTE and WiMAX, do not make use of a BSC. In general, each base station 8 facilitates communications using V-MIMO OFDM with mobile terminals 10, which are illustrated as being within the geographic confines of the cell 14 associated with the corresponding base station. Movement of mobile terminals 10 in relation to the base stations 8 can result in significant fluctuation in channel conditions as a consequence of multipath distortion, terrain variation, reflection and/or interference caused by man-made objects (such as buildings and other structures), and so on.

Multiple mobile terminals 10 may be logically grouped together to form a V-MIMO group 16. Of note, although FIG. 1 shows two mobile terminals 10 grouped to form V-MIMO group 16, the invention is not limited to such. It is contemplated that more than two mobile terminals can exist in a V-MIMO group 16. It is also contemplated that a mobile terminal can have more than one antenna to operate using traditional MIMO for wireless communications as well as participate as part of a V-MIMO group 16. Even using diversity channels, where orthogonality-based scheduling is ineffective and mobile terminals 10 therefore interfere with each other, mobile terminals 10 can still be paired in accordance with the present invention to take advantage of the multi-user gain associated with MIMO wireless communication.

Base station 8 is also shown in FIG. 1 as including 2 antennas 18 to support V-MIMO operation. It is understood that the present invention is not limited to such and that base station 8 can include more than two antennas 18 or even a single antenna 18 in support of multiple mobile terminals 10. FIG. 1 shows each mobile terminals 10 engaged in wireless communication with each antenna 18 of base station 8.

A high level overview of the mobile terminals 10 and base stations 8 of the present invention is provided prior to delving into the structural and functional details of the preferred embodiments. It is understood that relay nodes can incorporate those structural and functional aspects described herein with respect to base stations 8 and mobile terminals 10 as may be needed to perform the functions described herein.

Figure 2:
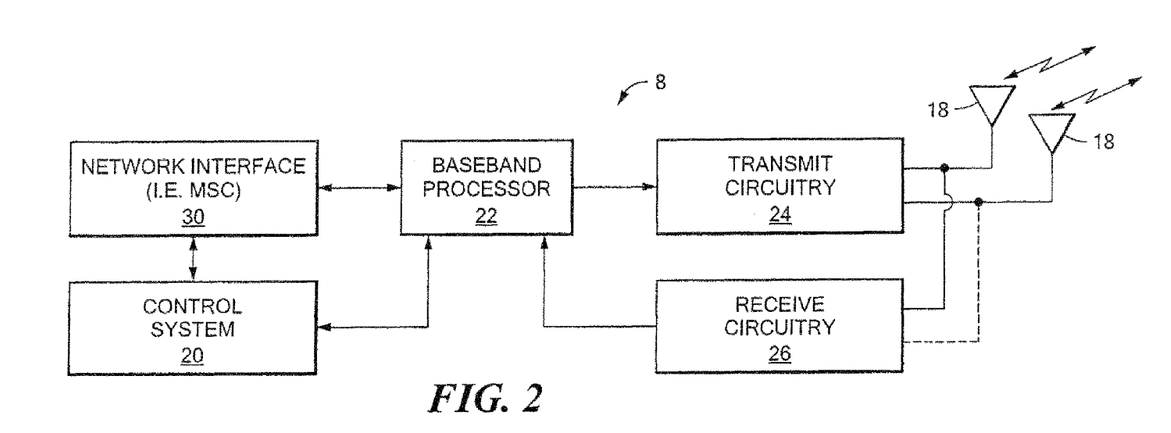
FIG. 2 is a block diagram of an exemplary base station constructed in accordance with the principles of the present invention.

With reference to FIG. 2, a base station 8 configured according to one embodiment of the present invention is illustrated. The base station 8 generally includes a control system 20, a baseband processor 22, transmit circuitry 24, receive circuitry 26, one or more antennas 18, and a network interface 30. The receive circuitry 26 receives radio frequency signals bearing information from one or more remote transmitters provided by mobile terminals 10 (illustrated in FIG. 3). Preferably, a low noise amplifier and a filter (not shown) cooperate to amplify and remove out-of-band interference from the signal for processing. Down conversion and digitization circuitry (not shown) then down converts the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors ("DSPs") or application-specific integrated circuits ("ASICs"). The received information is then sent across a wireline or wireless network via the network interface 30 or transmitted to another mobile terminal 10 serviced by the base station 8.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by a carrier signal having a desired transmit frequency or frequencies. A power amplifier (not shown) amplifies the modulated carrier signal to a level appropriate for transmission, and delivers the modulated carrier signal to the antennas 18 through a matching network (not shown). Modulation and processing details are described in greater detail below.

Figure 3:
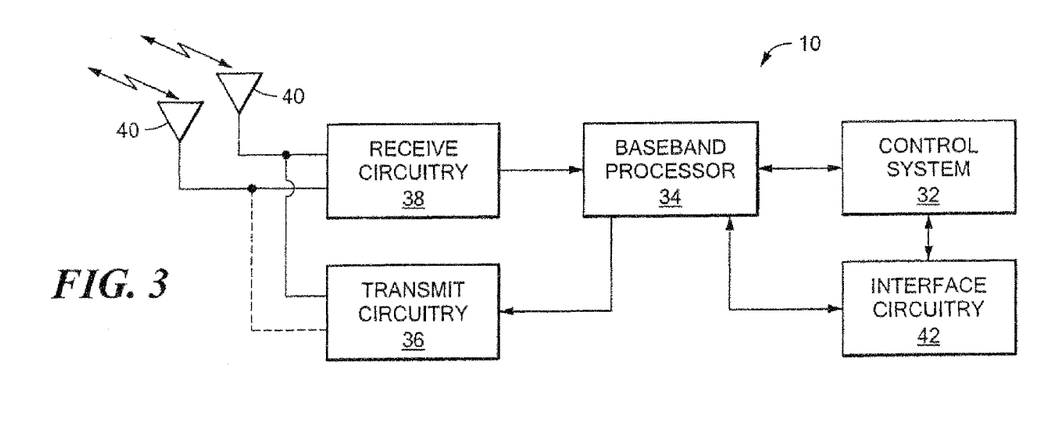
FIG. 3 is a block diagram of an exemplary mobile terminal constructed in accordance with the principles of the present invention.

With reference to FIG. 3, a mobile terminal 10 configured according to one embodiment of the present invention is described. Similar to base station 8, a mobile terminal 10 constructed in accordance with the principles of the present invention includes a control system 32, a baseband processor 34, transmit circuitry 36, receive circuitry 38, one or more antennas 40, and user interface circuitry 42. The receive circuitry 38 receives radio frequency signals bearing information from one or more base stations 8. Preferably, a low noise amplifier and a filter (not shown) cooperate to amplify and remove out-of-band interference from the signal for processing. Down conversion and digitization circuitry (not shown) then down convert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations, as will be discussed in greater detail below. The baseband processor 34 is generally implemented in one or more digital signal processors ("DSPs") and application specific integrated circuits ("ASICs").

With respect to transmission, the baseband processor 34 receives digitized data, which may represent voice, data, or control information, from the control system 32, which the baseband processor 34 encodes for transmission. The encoded data is output to the transmit circuitry 36, where it is used by a modulator to modulate a carrier signal that is at a desired transmit frequency or frequencies. A power amplifier (not shown) amplifies the modulated carrier signal to a level appropriate for transmission, and delivers the modulated carrier signal to the antennas 40 through a matching network (not shown). Various modulation and processing techniques available to those skilled in the art are applicable to the present invention.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation is implemented, for example, through the performance of an Inverse Fast Fourier Transform ("IFFT") on the information to be transmitted. For demodulation, a Fast Fourier Transform ("FFT") on the received signal is performed to recover the transmitted information. In practice, the IFFT and FFT are provided by digital signal processing carrying out an Inverse Discrete Fourier Transform ("IDFT") and Discrete Fourier Transform ("DFT"), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In one embodiment, OFDM is used for at least the downlink transmission from the base stations 8 to the mobile terminals 10. Each base station 8 is equipped with n transmit antennas 18, and each mobile terminal 10 is equipped with m receive antennas 40. Notably, the respective antennas can be used for reception and transmission using appropriate duplexers or switches and are so labeled only for clarity. FIG. 1 shows n=2 and m=2.

Figure 4:
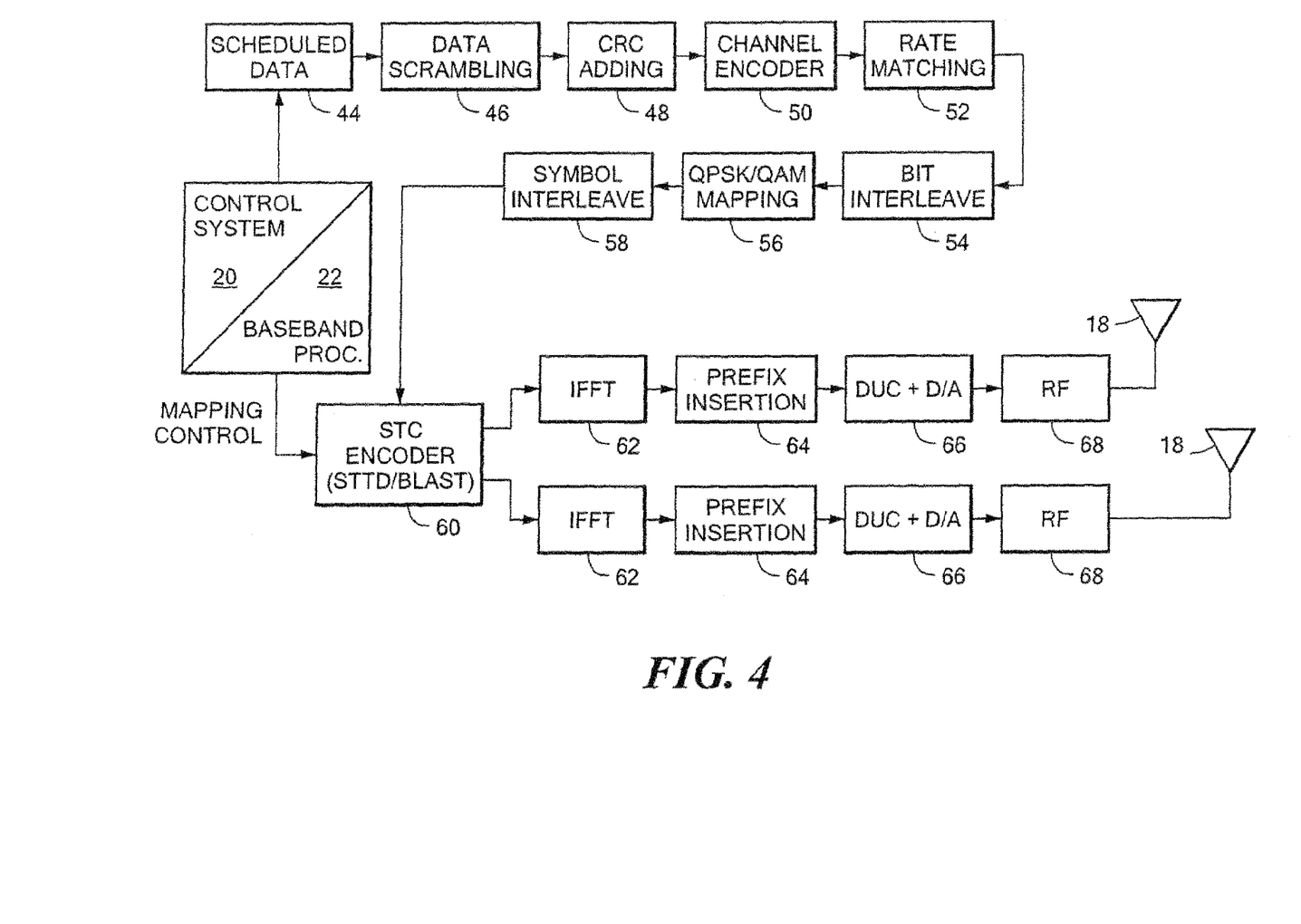
FIG. 4 is a block diagram of an exemplary OFDM architecture constructed in accordance with the principles of the present invention.

With reference to FIG. 4, a logical OFDM transmission architecture is described according to one embodiment. Initially, the base station controller 10 sends data to be transmitted to various mobile terminals 10 to the base station 8. The base station 8 may use the channel quality indicators ("CQIs") associated with the mobile terminals to schedule the data for transmission as well as select appropriate coding and modulation for transmitting the scheduled data. The CQIs may be provided directly by the mobile terminals 10 or determined at the base station 8 based on information provided by the mobile terminals 10. In either case, the CQI for each mobile terminal 10 is a function of the degree to which the channel amplitude (or response) varies across the OFDM frequency band.

The scheduled data 44, which is a stream of bits, is scrambled in a manner reducing the peak-to-average power ratio associated with the data using data scrambling logic 46. A cyclic redundancy check ("CRC") for the scrambled data is determined and appended to the scrambled data using CRC adding logic 48. Next, channel coding is performed using channel encoder logic 50 to effectively add redundancy to the data to facilitate recovery and error correction at the mobile terminal 10. Again, the channel coding for a particular mobile terminal 10 is based on the CQI. The channel encoder logic 50 uses known Turbo encoding techniques in one embodiment. The encoded data is then processed by rate matching logic 52 to compensate for the data expansion associated with encoding.

Bit interleaver logic 54 systematically reorders the bits in the encoded data to minimize the loss of consecutive data bits. The resultant data bits are systematically mapped into corresponding symbols depending on the chosen baseband modulation by mapping logic 56. Preferably, Quadrature Amplitude Modulation ("QAM") or Quadrature Phase Shift Key ("QPSK") modulation is used. The degree of modulation is preferably chosen based on the CQI for the particular mobile terminal. The symbols may be systematically reordered to further bolster the immunity of the transmitted signal to periodic data loss caused by frequency selective fading using symbol interleaver logic 58.

At this point, groups of bits have been mapped into symbols representing locations in an amplitude and phase constellation. When spatial diversity is desired, blocks of symbols are then processed by space-time block code ("STC") encoder logic 60, which modifies the symbols in a fashion making the transmitted signals more resistant to interference and more readily decoded at a mobile terminal 10. The STC encoder logic 60 will process the incoming symbols and provide n outputs corresponding to the number of transmit antennas 18 for the base station 8. The control system 20 and/or baseband processor 22 will provide a mapping control signal to control STC encoding. At this point, assume the symbols for the n outputs are representative of the data to be transmitted and capable of being recovered by the mobile terminal 10. See A. F. Naguib, N. Seshadri, and A. R. Calderbank, "Applications of space-time codes and interference suppression for high capacity and high data rate wireless systems," Thirty-Second Asilomar Conference on Signals, Systems & Computers, Volume 2, pp. 1803-1810, 1998, which is incorporated herein by reference in its entirety.

For the present example, assume the base station 8 has two antennas 18 (n=2) and the STC encoder logic 60 provides two output streams of symbols. Accordingly, each of the symbol streams output by the STC encoder logic 60 is sent to a corresponding IFFT processor 62, illustrated separately for ease of understanding. Those skilled in the art will recognize that one or more processors may be used to provide such digital signal processing, alone or in combination with other processing described herein. It is further envisioned that processing functionality can likewise be consolidated into a lesser number of processors than referenced herein. The IFFT processors 62 will preferably operate on the respective symbols to provide an inverse Fourier Transform. The output of the IFFT processors 62 provides symbols in the time domain. The time domain symbols are grouped into frames, which are associated with a prefix by like insertion logic 64. Each of the resultant signals is up-converted in the digital domain to an intermediate frequency and converted to an analog signal via the corresponding digital up-conversion (DUC) and digital-to-analog (D/A) conversion circuitry 66. The resultant (analog) signals are then simultaneously modulated at the desired RF frequency, amplified, and transmitted via the RF circuitry 68 and antennas 18. Notably, pilot signals known by the intended mobile terminals 10 are scattered among the sub-carriers. The mobile terminals 10, which are discussed in detail below, will use the pilot signals for channel estimation.

Figure 5:
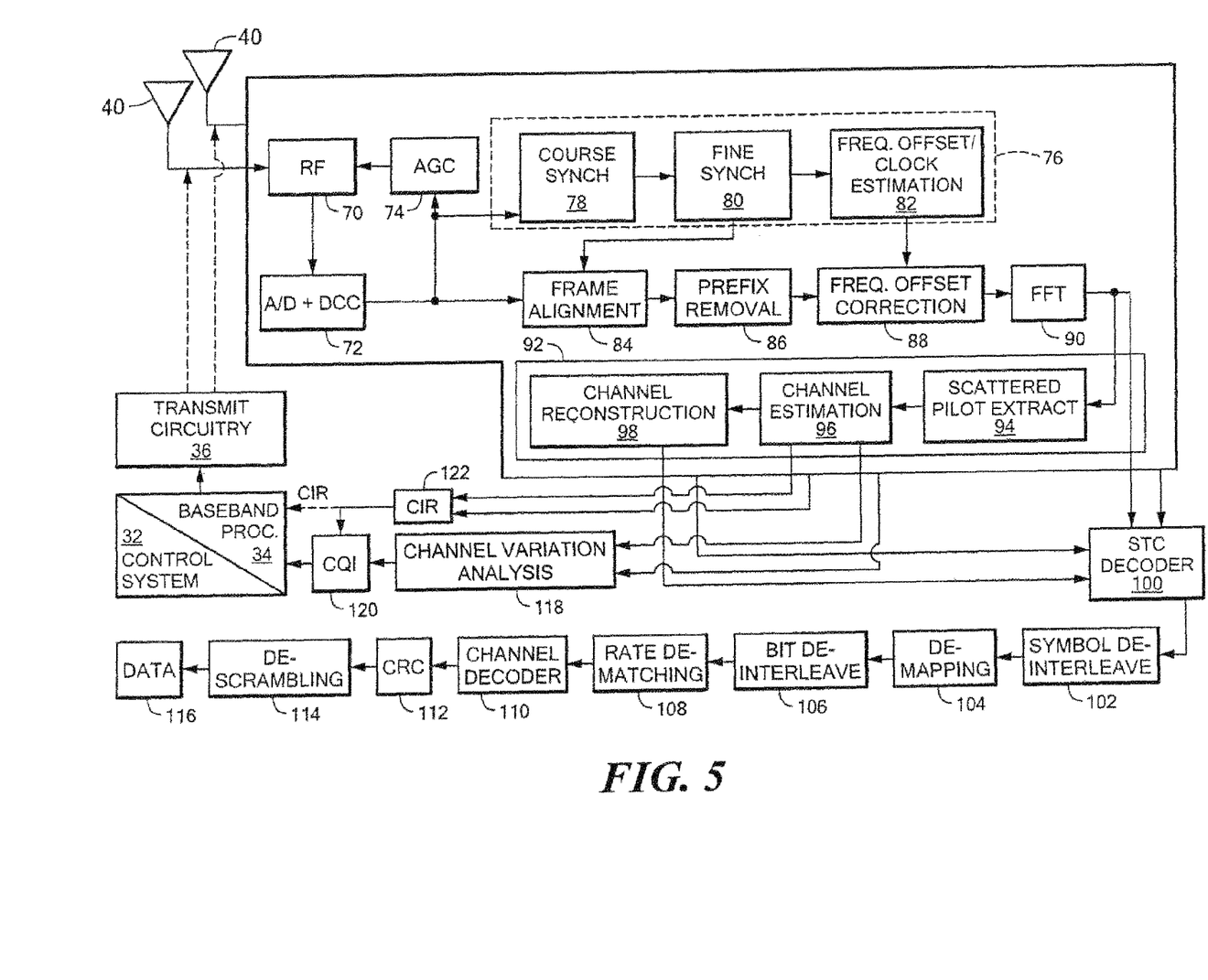
FIG. 5 is a block diagram of the flow of received signal processing in accordance with the principles of the present invention.

Reference is now made to FIG. 5 to illustrate reception of the transmitted signals by a mobile terminal 10. Upon arrival of the transmitted signals at each of the antennas 40 of the mobile terminal 10, the respective signals are demodulated and amplified by corresponding RF circuitry 70. For the sake of conciseness and clarity, only one of the receive paths is described and illustrated in detail, it being understood that a receive path exists for each antenna 40. Analog-to-digital ("A/D") converter and down-conversion circuitry 72 digitizes and downconverts the analog signal for digital processing. The resultant digitized signal may be used by automatic gain control circuitry ("AGC") 74 to control the gain of the amplifiers in the RF circuitry 70 based on the received signal level.

Initially, the digitized signal is provided to synchronization logic 76, which includes coarse synchronization logic 78, which buffers several OFDM symbols and calculates an autocorrelation between the two successive OFDM symbols. A resultant time index corresponding to the maximum of the correlation result determines a fine synchronization search window, which is used by fine synchronization logic 80 to determine a precise framing starting position based on the headers. The output of the fine synchronization logic 80 facilitates frame acquisition by frame alignment logic 84. Proper framing alignment is important so that subsequent FFT processing provides an accurate conversion from the time to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 86 and resultant samples are sent to frequency offset correction logic 88, which compensates for the system frequency offset caused by the unmatched local oscillators in the transmitter and the receiver. Preferably, the synchronization logic 76 includes frequency offset and clock estimation logic 82, which is based on the headers to help estimate such effects on the transmitted signal and provide those estimations to the correction logic 88 to properly process OFDM symbols.

Figure 6:
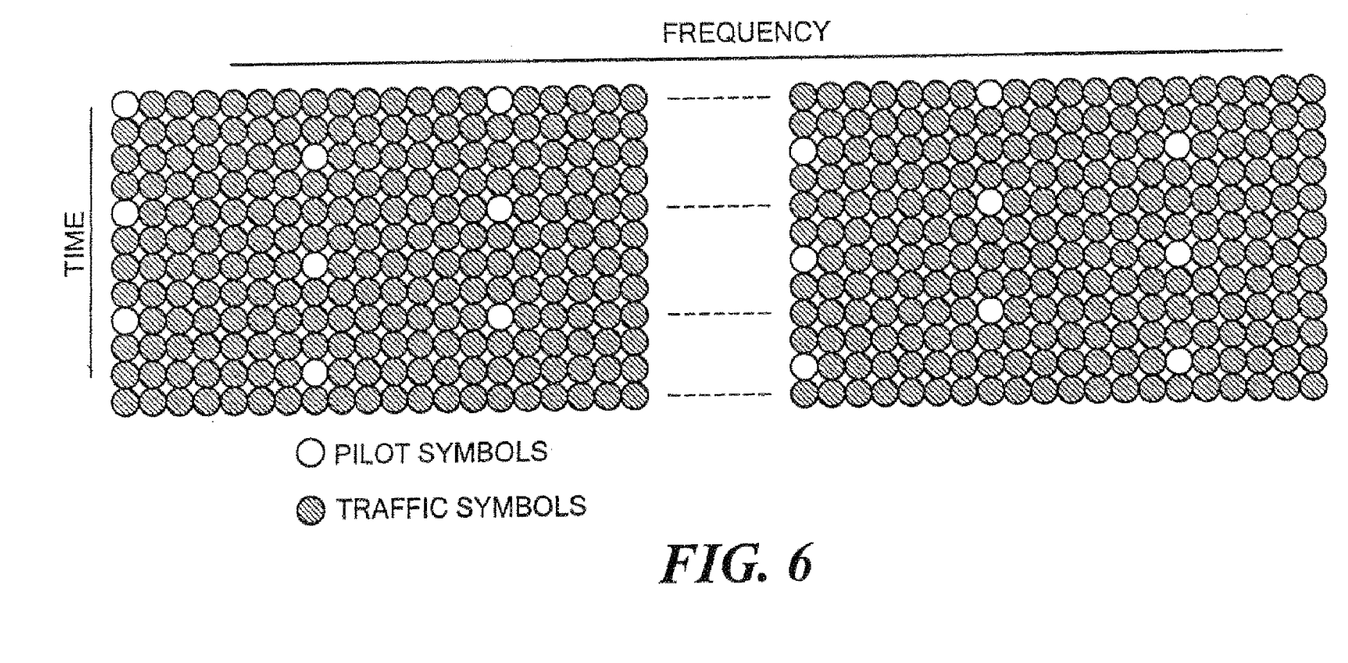
FIG. 6 is a diagram of an exemplary scattering of pilot symbols among available sub-carriers.

At this point, the OFDM symbols in the time domain are ready for conversion to the frequency domain using FFT processing logic 90. The results are frequency domain symbols, which are sent to processing logic 92. The processing logic 92 extracts the scattered pilot signal using scattered pilot extraction logic 94, determines a channel estimate based on the extracted pilot signal using channel estimation logic 96, and provides channel responses for all sub-carriers using channel reconstruction logic 98. In order to determine a channel response for each of the sub-carriers, the pilot signal is essentially multiple pilot symbols that are scattered among the data symbols throughout the OFDM sub-carriers in a known pattern in both time and frequency. FIG. 6 illustrates an exemplary scattering of pilot symbols among available sub-carriers over a given time and frequency plot in an OFDM environment. Referring again to FIG. 5, the processing logic compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 100, which provides STC decoding on both received paths to recover the transmitted symbols. The channel reconstruction information provides equalization information to the STC decoder 100 sufficient to remove the effects of the transmission channel when processing the respective frequency domain symbols The recovered symbols are placed back in order using symbol de-interleaver logic 102, which corresponds to the symbol interleaver logic 58 of the transmitter. The de-interleaved symbols are then demodulated or de-mapped to a corresponding bitstream using de-mapping logic 104. The bits are then de-interleaved using bit de-interleaver logic 106, which corresponds to the bit interleaver logic 54 of the transmitter architecture. The de-interleaved bits are then processed by rate de-matching logic 108 and presented to channel decoder logic 110 to recover the initially scrambled data and the CRC checksum. Accordingly, CRC logic 112 removes the CRC checksum, checks the scrambled data in traditional fashion, and provides it to the de-scrambling logic 114 for de-scrambling using the known base station de-scrambling code to recover the originally transmitted data 116.

Referring again to FIG. 1, in accordance with the present invention, scheduling can be combined with digital signal processing to provide a throughput gain when compared with known techniques. As is discussed below in detail, this gain can be realized by pairing a high SINR mobile terminal 10 with a low SINR mobile terminal 10 to form a V-MIMO arrangement, and using decision-based feedback interference cancellation. Decision-based feedback interference cancellation is used to remove the signal corresponding to the high SINR mobile terminal 10 to facilitate detection of the low SINR mobile terminal 10. Where more than two mobile terminals 10 are part of V-MIMO group 16, the signals for mobile terminals 10 can be iteratively removed beginning with the highest SINR mobile terminal 10. Low SINR mobile terminals 10 are typically present at the cell 14 edge, thereby consuming significant battery power during transmission. The scheduling method of the present invention advantageously provides quick and efficient transmission scheduling, thereby minimizing the unnecessary wasted consumption of battery power.

As is discussed below in detail, the present invention, through scheduling and decision-based feedback interference cancellation allows resources to be scheduled in a manner that adapts the data rate, i.e., the adaptive modulation coding ("AMC") scheme, to the channel quality. In other words, the present invention allows one to establish as high a modulation and coding rate for the capability of the channel as is reasonably possible. This arrangement is described as follows.

Initially, it is noted that multi-user sharing of a communication channel, such as in a V-MIMO environment, does not change the overall capacity of the wireless communication channel. Assume system 6 has two transmitting sources, such as mobile terminals 10a and 10b, transmitting signals $s_1$ and $s_2$, respectively, having power $P_1$ and $P_2$, respectively where $P_1 > P_2$, and noise signal $n_0$ having power $P_n$. In this case, the received signal "r" can be written as $r = s_1 + s_2 + n_0$. If $s_2$ is treated as Gaussian noise, i.e., interference, when $s_1$ is decoded, the result is that the channel capacity, $C_1$, for mobile terminal 10a is $C_1 = \log_2(1 + P_1/(P_2 + P_n))$. If $s_1$ can be successfully decoded and subtracted from "r" by base station 8, the remaining capacity with respect to mobile terminal 10b, i.e., $s_2$, is $C_2 = \log_2(1 + P_2/P_n)$. As such, total channel capacity "C" is $C_1 + C_2$ which equals $\log_2(1 + (P_1 + P_2)/P_n)$. Accordingly, there is no loss of total channel capacity in the face of multi-mobile terminal 10 sharing.

The preceding example is based on the assumption that $s_2$ is treated as Gaussian noise. However, in traditional MIMO systems, S2 is not treated as Gaussian noise. Rather, minimum mean square error ("MMSE") interference suppression or maximum likelihood ("ML") detection is used. These techniques employ interference cancellation using spectral processing. In accordance with these techniques, channel capacity $C_1$ is actually much higher than in the Gaussian noise assumption method described above. As a result, it is shown that the use of interference cancellation results in channel gain in a multi-mobile terminal 10 environment. This channel gain can be leveraged through the use of scheduling and efficient interference cancellation.

The present invention leverages the multi-mobile terminal gain by iteratively scheduling the stronger layer, i.e., independent mobile terminal 10 data stream, based on the post-processing effective SINR. In accordance with one embodiment, this scheduling is done by base station 8. Scheduling in the context of the present invention includes assigning a modulation coding set ("MCS"). The weaker layer(s) are then iteratively scheduled as if the stronger layer does not exist. The result is that there is much higher throughput in the weaker second (and lower) layers as compared with known techniques. Because the weaker layer is typically power limited, the improved scheduling methodology provides power and diversity gain for the weaker layer(s). Of course, it is understood that the determination of which layer is the strongest results, at least in part, on the MCS assigned by scheduling base station 8 to mobile terminal 10. The scheduling base station 8 can determine which mobile terminal 10 uses the interference-free channel. Although this determination is typically based on CQI, it can also be based on quality of service ("QoS").

It is also noted that, although a particular layer might first appear stronger than another, that layer may turn out to be weaker when a stronger layer is cancelled. For example, if three layers A, B and C are present and initial strength measurements reveal that A is the strongest, B is the second strongest and C is the weakest, it may turn out during subsequent iterative measurements that C is actually stronger than B when layer A is cancelled.

As noted above, cancellation in accordance with the present invention occurs at the receiver, i.e., base station 8. This cancellation is decision-based feedback interference cancellation ("DFIC"). In accordance with the present invention, Turbo decoding of each layer is done serially and is done after interference cancellation in order to avoid unnecessary decoding. The decoding order is based on the scheduling of the mobile terminals 10 which itself is based on DFIC. This arrangement yields performance increases over known wireless transmission schemes with respect to both system throughput, e.g., channel capacity, and receiver complexity. The scheduler of the present invention exploits the multi-mobile terminal channel gain discussed above.

Figure 7:
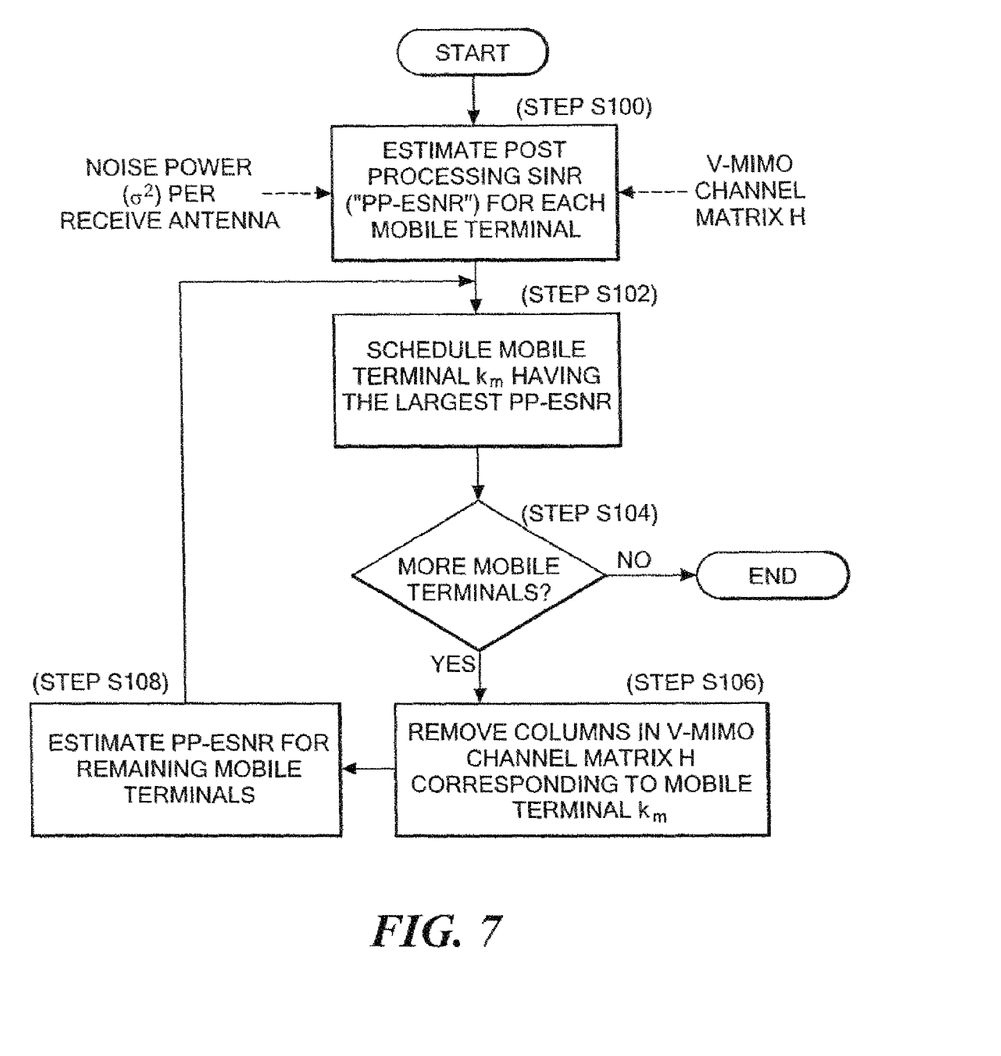
FIG. 7 is a flow chart of an exemplary decision-based feedback interference cancellation process of the present invention.

An exemplary decision-based feedback interference cancellation process constructed in accordance with the principles of the present invention is described with reference to FIG. 7. The process is explained with respect to base station 8. However, it is understood that other devices in system 6 can be used to perform the below-described scheduling process. Initially, using the measured received noise power on a per-antenna basis and using the V-MIMO channel matrix ("H") stored by base station 8, the post processing SINR ("PP-ESNR") for each mobile station 10 in V-MIMO group 16 is estimated (step S100). By way of non-limiting example, the channel matrix "H" can be formed by receiving pilot signals from the mobile terminals 10, estimating the channels from these mobile terminals 10 using the received pilot signals and forming the channel matrix "H" from these estimated channels.

The mobile terminal 10 $k_m$ having the largest PP-ESNR is scheduled, i.e., assigned an MCS based at least in part on the measured SINR (step S102). If there are more mobile terminals 10 in V-MIMO group 16 (step S104), the columns in the V-MIMO channel matrix "H" corresponding to mobile terminal 10 $k_m$ are removed (step S106) and the resultant matrix "H" stored. The PP-ESNR is then re-estimated for the remaining channels (step S108) and the process returns to step S102 for the subsequent scheduling of the remaining mobile terminal(s) 10. As is readily observable, this subsequent scheduling is based on the cancelled signal (it is considered interference) of the higher SINR mobile stations 10.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A wireless virtual MIMO ("V-MIMO") communication method, comprising:
   estimating post processing signal to interference and noise ratios ("SINR") for a plurality of signals corresponding to a plurality of mobile terminals arranged as a V-MIMO group;
   selecting the one of the plurality of mobile terminals having the highest post processing SINR;
   scheduling wireless communication for the selected mobile terminal;
   canceling the signal corresponding to the selected mobile terminal prior to performing a decoding of the signal corresponding to the selected mobile terminal;
   re-estimating post processing signal to interference and noise ratios ("SINR") for the signals corresponding to the remaining mobile terminals;
   selecting the one of the remaining mobile terminals having the highest post processing SINR; and
   scheduling wireless communication for the selected remaining mobile terminal.

2. The method according to claim 1, wherein scheduling wireless communication includes assigning a modulation coding set ("MCS").

3. The method according to claim 1, wherein canceling the signal corresponding to the selected mobile terminal includes performing decision-based interference cancellation.

4. The method according to claim 1, further comprising performing Turbo decoding on the selected one of the remaining mobile terminals having the highest post processing SINR.

5. The method according to claim 1, further comprising storing values corresponding to the signals received from the plurality of mobile terminals as a channel matrix.

6. The method according to claim 5, wherein canceling the signal corresponding to the selected mobile terminal includes removing columns in the channel matrix corresponding to the selected mobile terminal.

7. The method of claim 1 wherein an order of decoding signals is based on an order in which the signals are scheduled.

8. A wireless communication system, the system comprising a scheduling device, the device including:
   a central processing unit operating to:
      estimate post processing signal to interference and noise ratios ("SINR") for the plurality of signals corresponding to a plurality of mobile terminals arranged as a virtual MIMO (V-MIMO) group;
      select the one of the plurality of mobile terminals having the highest post processing SINR;
      schedule wireless communication for the selected mobile terminal;
      cancel the signal corresponding to the selected mobile terminal prior to performing a decoding of the signal corresponding to the selected mobile terminal;
      re-estimate post processing signal to interference and noise ratios ("SINR") for the signals corresponding to the remaining mobile terminals;

select the one of the remaining mobile terminals having the highest post processing SINR; and
schedule wireless communication for the selected remaining mobile terminal.

9. The system according to claim 8, further comprising at least one relay node in communication with the scheduling device, the scheduling device communicating with the at least one mobile terminal via the at least one relay node.

10. The system according to claim 8, wherein canceling the signal corresponding to the selected mobile terminal includes performing decision-based interference cancellation.

11. The system according to claim 8, wherein the central processing unit further operates to perform Turbo decoding on the selected one of the remaining mobile terminals having the highest post processing SINR.

12. The system according to claim 8, wherein the scheduling device further comprises a memory, the memory storing values corresponding to the signals received from the plurality of mobile terminals as a channel matrix.

13. The system according to claim 12, wherein canceling the signal corresponding to the selected mobile terminal includes the central processor operating to remove columns in the stored channel matrix corresponding to the selected mobile terminal.

14. The system according to claim 8, wherein the scheduling device is included as part of a base station, the base station having a plurality of antennas for wireless communication with the plurality of mobile terminals in the V-MIMO group.

15. The system of claim 8, wherein the central processing unit further operates to order a decoding of signals based on an order in which the signals are scheduled.

16. A wireless virtual MIMO ("V-MIMO") communication method, comprising:
estimating post processing signal to interference and noise ratios ("SINR") for a first signal corresponding to a first mobile terminal and second signal corresponding to a second mobile terminal arranged as a V-MIMO group;
scheduling wireless communication for the one of the first and second mobile terminals having the highest post processing SINR;
canceling the signal corresponding to the one of the first and second mobile terminals having the highest post processing SINR prior to performing a decoding of the signal corresponding to the one of the first and second mobile terminals having the highest post processing SINR;
re-estimating a post processing signal to interference and noise ratio ("SINR") for the signal corresponding to the remaining one of the first mobile terminal and the second mobile terminal; and
scheduling wireless communication for the remaining one of the first and second mobile terminals.

17. The method according to claim 16, wherein scheduling wireless communication includes assigning a modulation coding set ("MCS").

18. The method according to claim 16, wherein canceling the signal corresponding to the selected mobile terminal includes performing decision-based interference cancellation.

19. The method according to claim 16, further comprising storing values corresponding to the signals received from the plurality of mobile terminals as a channel matrix, wherein canceling the signal corresponding to the selected mobile terminal includes removing columns in the channel matrix corresponding to the selected mobile terminal.

20. The method of claim 16, wherein an order of decoding signals is based on an order in which the signals are scheduled.

* * * * *